United States Patent
Imamura et al.

(10) Patent No.: US 6,314,238 B1
(45) Date of Patent: Nov. 6, 2001

(54) LENS-FITTED PHOTO FILM UNIT AND FLASH DEVICE

(75) Inventors: Takashi Imamura; Hirokazu Yokoo; Yuji Mikami; Nobuyuki Kameyama, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/207,620

(22) Filed: Dec. 9, 1998

(30) Foreign Application Priority Data

Dec. 17, 1997 (JP) .................................................. 9-347439
Dec. 18, 1997 (JP) .................................................. 9-349272
Dec. 26, 1997 (JP) .................................................. 9-359056

(51) Int. Cl.[7] .............................. G03B 17/02; G03B 7/26
(52) U.S. Cl. .............................. 396/6; 396/205; 396/543
(58) Field of Search ................................ 396/6, 543, 205

(56) References Cited

U.S. PATENT DOCUMENTS

| | | | |
|---|---|---|---|
| 5,565,943 | * 10/1996 | Muramatsu et al. | 396/6 |
| 5,784,658 | * 7/1998 | Hata et al. | 396/6 |
| 5,822,640 | * 10/1998 | Dassero et al. | 396/543 |
| 6,061,531 | * 5/2000 | Yamaguchi | 396/6 |

FOREIGN PATENT DOCUMENTS

WO 99/10772   3/1999   (WO) .
WO 99/18477   4/1999   (WO) .

* cited by examiner

Primary Examiner—David M. Gray
(74) Attorney, Agent, or Firm—Young & Thompson

(57) ABSTRACT

In a film unit, a charge operation member is held on a front side of a guide member to be slidable between an ON position to turn on a flash charge switch of a built-in flash device and an OFF position to turn off the flash charge switch. The guide member is mounted stationarily to a front side of a flash circuit board of the flash device. Joints between front and rear cover of the film unit are set away from those circuit portions of the flash device where high voltage current flows. The flash charge switch is constituted of a metal contact blade and contact chips provided on the flash circuit board. The metal contact blade is bent roundly at a base portion of a pair of resilient arms. The charge operation member keeps on pressing the arms onto the contact chips in the ON position. The flash device charges a main capacitor while the flash charge switch is on, and automatically stops charging when the charge voltage goes above a predetermined voltage. A light emitting diode indicates the completion of charging.

19 Claims, 10 Drawing Sheets

LENS-FITTED PHOTO FILM UNIT AND FLASH DEVICE

BACKGROUND OF THE INVENTION

1. Field of the Invention

The present invention relates to a lens-fitted photo film unit with a built-in flash device wherein flash device elements, including a flash charge switch and a flash projector, are integrated into a unit on a flash circuit board. The present invention also relates to a flash device for use in a lens-fitted photo film unit or a camera.

2. Background Arts

A lens-fitted photo film unit is widely known as a device, which is provided with a simple exposure mechanism and is loaded with an unexposed photo film cartridge in the factory, so that anyone can enjoy photography without bothering about loading and rewinding the film. Hereinafter, the lens-fitted photo film unit will be referred to as a film unit.

There are many film units on the market that have a flash device incorporated therein to make it possible to photograph in the dark. The film units mostly have a unit body that is constituted of a rear cover and a basic portion holding a roll of unexposed photo filmstrip therebetween, an exposure unit that has a taking lens, a shutter mechanism and so forth as an integrated assembly and is attached to a front middle area of the basic portion, a flash unit that constitutes the built-in flash device and is attached to the front of the basic portion on one side of the exposure unit, and a front cover for covering the front of the basic portion so as to hold the exposure unit and the flash unit onto the basic portion. For making a flash photography, it is necessary to charge a main capacitor of the flash device up to a predetermined voltage. Therefore, it is usual to turn on the flash charge switch to charge the main capacitor prior to the flash photography.

The flash charge switch is turned on by operating a charging operation member. There are various charging operation members: a push button type is formed integrally with the front cover and bent down resiliently to turn on the flash charge switch, a pull-up type is pulled up to turn the flash charge switch on, and a sliding type is slidable between an ON position and an OFF position. The sliding type charge operation member is either mounted to the front cover through a sliding guide member, or held between the front cover and the flash circuit board.

Of the film unit where the charge operation member is mounted to the front cover in a slidable fashion, the front cover is complicated in construction, and it needs another process for mounting the flash charge member to the front cover prior to an assembling process of the unit body. This type is therefore disadvantageous in view of production efficiency and cost. The film where the charge operation member is sandwiched between the front cover and the flash circuit board is more advantageous in view of production efficiency and cost, but it is necessary to position the charge operation member stably in the assembling process of the unit body. Forming a guide member for the charge operation member on the basic portion might be possible but difficult because it goes against the requirement of making the film unit thinner.

The flash circuit is classified into two types: one continues charging only while the flash charge switch is ON, and the other starts charging once the flash charge switch is turned on for a moment, continues charging even after the flash charge switch is turned off, and stops charging automatically when the charge voltage reaches a predetermined level. The latter type will be called an automatic charge-stopping type. A flash device where the flash charge switch is kept in the ON position by keeping pressing a push button type charge operation member is the simplest in mechanical and electrical construction, and thus requires the lowest production cost. However, keeping pressing the charge operation member to the end of charging is obviously inconvenient. A flash device which continues charging till the charge voltage reaches the predetermined level once the flash charge switch is turned on by pressing a push button type charge operation member for a moment is improved in workability and is effective to reduce a waste of electric power. However, the automatic charge-stopping type flash circuit needs more circuit elements and a higher production cost. According to its circuit construction, the automatic charge-stopping type flash circuit automatically starts charging again after the flashing, so that it is impossible to make a non-flash photography in succession to a flash photography.

On the other hand, the flash device using a sliding type or a pull-up type charge operation member has an advantage that it continues charging once the charge operation member is set to the ON position, and that the flashing can be interrupted by resetting the charge operation member to the OFF position. However, since the charging operation does not stop unless the user resets the charge operation member to the OFF position, the battery would run drawn to disable flashing any further if the user forget to turn off the flash charge switch.

Meanwhile, if a user should drop a film unit with a built-in flash device in the sea, sea water will ooze into the film unit. Because sea water is conductive, if the main capacitor of the flash device is charged at that time, the charged current can leak through the sea water. If the user touches the film unit with bare hand in that condition, the user will get an electric shock as the current flows through the sea water and the hand.

SUMMARY OF THE INVENTION

In view of the foregoing, an object of the present invention is to provide a film unit which is simple in construction and allows a charge operation member to be guided stably to a flash circuit board before a front cover is attached to hold the charge operation member between the front cover and the flash circuit board.

Another object of the present invention is to provide a film unit which is prevented from giving an electric shock if conductive water such as sea water extrudes into the film unit.

A further object of the present invention is to provide a flash device that is improved in workability of charging operation, reduces waste of battery consumption at a low cost, and allows the photographer to decide whether to fire a flash light or not.

According to the present invention, a film unit is provided with a flash charge switch mounted on a front side of a flash circuit board of a flash device, the flash charge switch being turned on to charge a main capacitor of the flash device; a charge operation member slidable between an ON position to turn on the flash charge switch and an OFF position to turn off the flash charge switch, the charge operation member being placed between the flash circuit board and a front cover, and partly protruding outward through an opening of the front cover; and a guide member placed between the charge operation member and the flash circuit board, for holding the charge operation member to be slidable between the ON position and the OFF position.

The guide member guides the charge operation member stably to the flash circuit board before the front cover is attached to sandwich the charge operation member between the front cover and the flash circuit board.

To prevent the electrification through an oozed conductive water extruding into a film unit, the present invention displaces joints between parts of a housing of the film unit, e.g. joints between front and rear covers, away from those circuit portions of the flash device where high voltage current flows.

A flash device according to the present invention is provided with a booster circuit including an oscillating transistor and an oscillating transformer, for boosting a low level source voltage up to a high level voltage and charging a main capacitor with current of the high level voltage; a flash charge switch connected to the booster circuit, to activate the booster circuit while the flash charge switch is on; a charge operation member switched over between an ON position to turn on the flash charge switch and an OFF position to turn off the flash charge switch; an auto-cutting circuit for deactivating the booster circuit when the main capacitor is charged up to a predetermined level; and a light emitting diode supplied from the oscillating transformer with a voltage which is proportional to the voltage charged in the main capacitor while the booster circuit is active, the light emitting diode lighting up to indicate completion of charging when the main capacitor is charged up to the predetermined level.

Since the charge operation member is switched over between the ON position to turn on the flash charge switch and the OFF position to turn off the flash charge switch, charging operation is easy and convenient. The auto-cutting circuit reduces waste of battery consumption, whereas the light emitting diode indicates the completion of charging at a low cost.

By providing a flash selection switch which is turned on or off to permit the flash discharge tube to flash, or prevent the flash discharge tube from flashing respectively, the photographer can decide whether to fire a flash light or not by switching over the charge operation member between the ON position and the OFF position.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein:

FIG. 1 is a perspective view of a film unit with its lens cover open and its flash charge switch of a flash device ON;

DETAILED DESCRIPTION OF PREFERRED EMBODIMENTS

Figure 1:
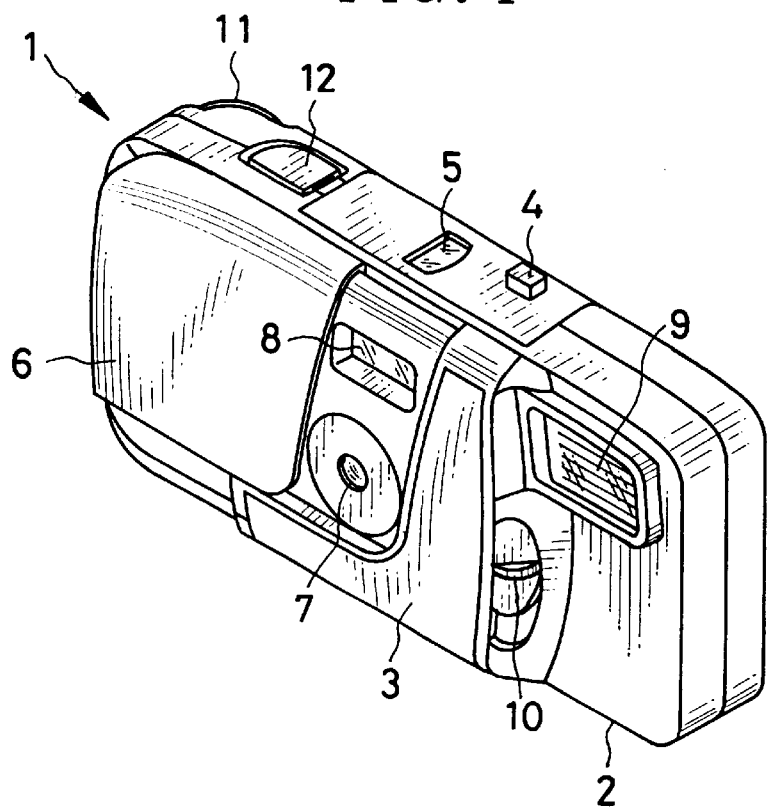

In FIG. 1, a film unit 1 consists of a unit body 2 containing a photo film cartridge therein and a label 3 put around a middle zone of the unit body 2. The unit body 2 is provided with a simple photographic device, including a taking lens 7, a viewfinder 8, a flash projector 9, a flash charge knob 10, a film winding wheel 11, and a shutter button 12, which are located outside the label 3. Also, a light guide 4 and a frame counter window 5 are provided on a top side of the unit body 2, and are exposed through openings of the label 3.

Figure 2:
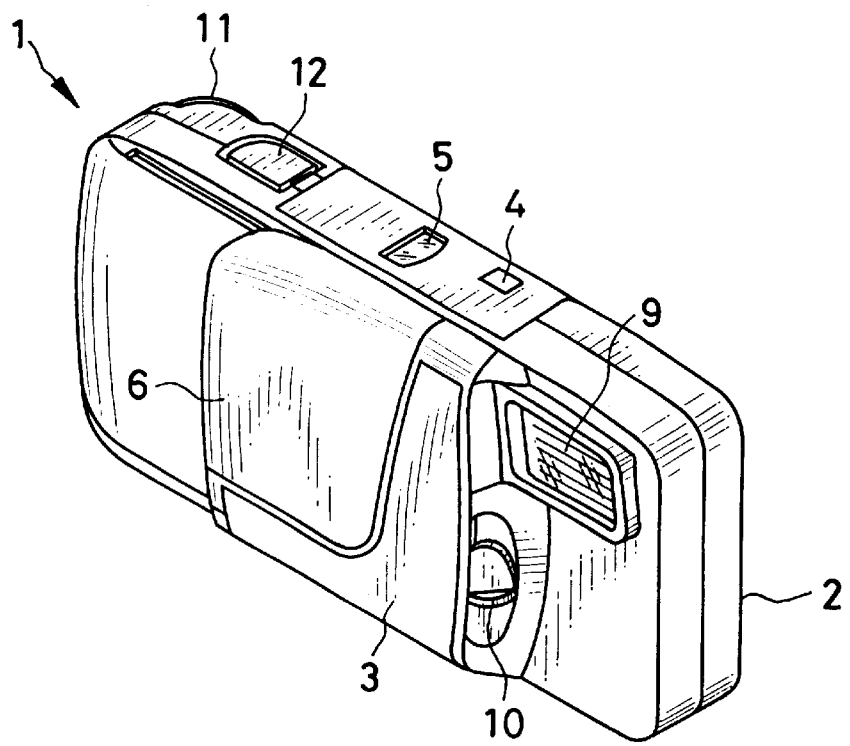
FIG. 2 is a perspective view of the film unit of FIG. 1, with its lens cover closed and its flash charge switch OFF.

A lens cover 6 is provided on a front face of the unit body 2, so as to be slidable horizontally between a closed position as shown in FIG. 2, covering the fronts of the taking lens 7 and the viewfinder 8 and an open position as shown in FIG. 1, uncovering these elements 7 and 8.

Figure 3:
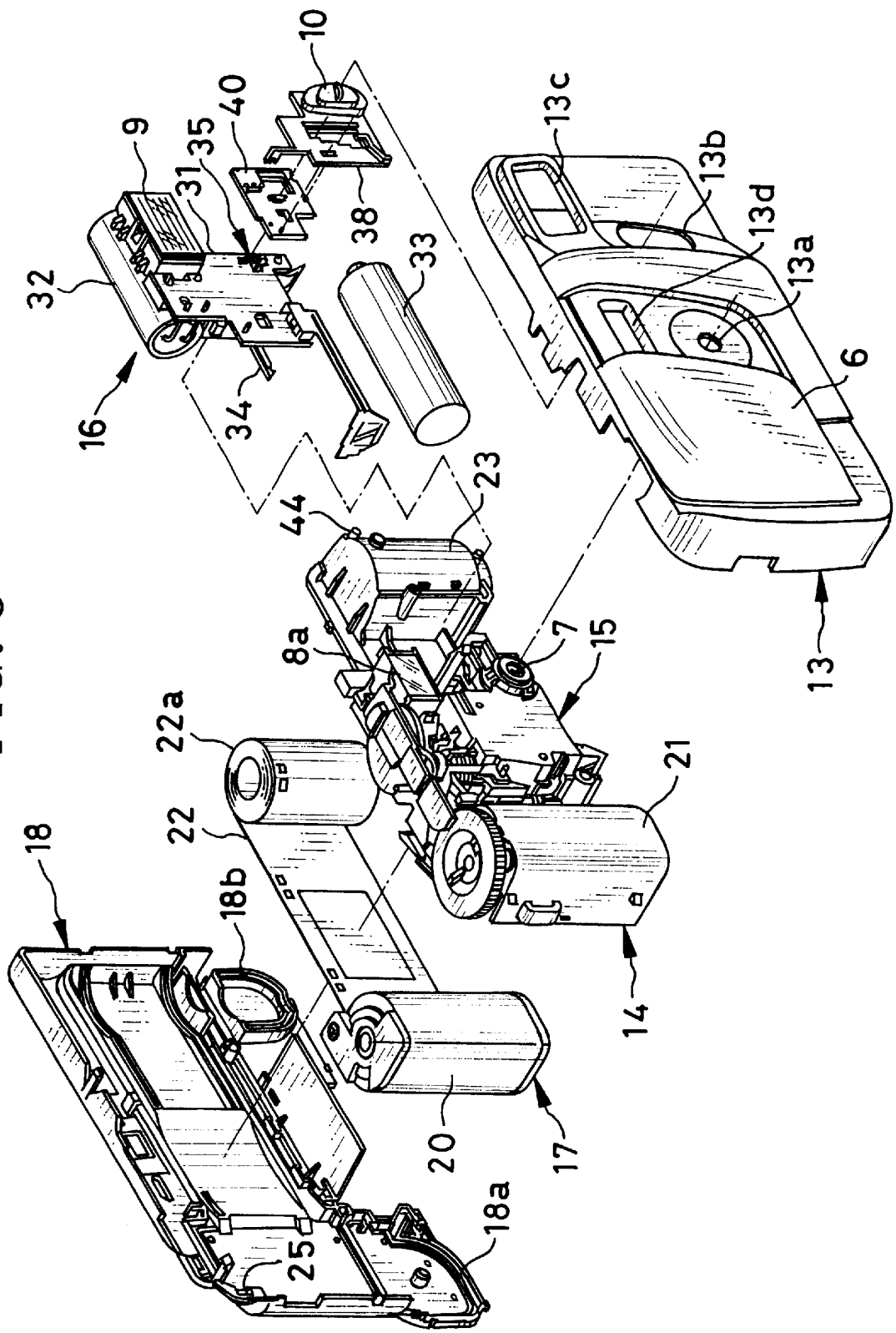
FIG. 3 is an exploded perspective view of the film unit of FIG. 1.

As shown in FIG. 3, the unit body 2 is constituted of a front cover 13, a basic portion 14, an exposure unit 15, a flash unit 16, a photo film cartridge 17, and a rear cover 18. The basic portion 14 has a cartridge chamber 21 and a film roll chamber 23 formed integrally therewith on opposite horizontal sides thereof, for holding respectively a cartridge shell 20 of the photo film cartridge 17 and an unexposed filmstrip 22 withdrawn from the cartridge shell 20 and coiled into a roll 22a.

These chambers 21 and 23 have open rear sides which are closed light-tightly by the rear cover 18, after the photo film cartridge 17 is loaded. Bottom sides of the cartridge chamber 21 and the film roll chamber 23 are also open, and are closed light-tightly by bottom lids 18a and 18b which are formed integrally with the rear cover 18.

The exposure unit 15 is an assembly in which necessary members for photography, including a shutter charging mechanism, a shutter mechanism, a film winding-stopping mechanism and a frame counter mechanism, are integrally mounted. Also, a finder optical system 8a and the light guide 4 is mounted to the exposure unit 15. The exposure unit 15 is attached to the front of the basic portion 14 in a middle area adjacent to the cartridge chamber 21. The shutter button 12 is also mounted to a top portion of the exposure unit 15, such that the shutter mechanism is activated upon the shutter button 12 being pressed. When the shutter mechanism is activated, the photo filmstrip 22 placed in an exposure aperture behind the exposure unit 15 is exposed to an optical image of a subject is formed through the taking lens 7.

The flash unit 16 is an assembly in which the flash projector 9, a main capacitor 32, a battery 33, a synchronizing switch 34 and a flash charge switch 35 are mounted to a flash circuit board 31, constituting a flash circuit. The flash unit 16 is attached to the front of the basic portion 14 between the exposure unit 15 and the film roll chamber 23. The front cover 13 is attached to the front of the basic portion 14 to cover the exposure unit 15 and the flash unit 16.

The front cover 13 is formed with openings 13a, 13b, 13c and 13d for exposing the taking lens 7, the flash charge knob 10, the flash projector 9 and the viewfinder optical system 8a respectively. Also, the lens cover 6 is mounted to the front cover 13 so as to be slidable between the open position and the closed position.

The film winding wheel 11 is mounted on top of the cartridge chamber 21. The film winding wheel 11 is partly exposed through an opening of the rear cover 18. After each exposure, the film winding wheel 3 is rotated in a winding direction, to wind up the filmstrip 22 by one frame into the cartridge shell 20, pull out its unexposed portion from the film roll chamber 23 and place it in the exposure aperture.

The light guide 4 functions as a charge condition indicator, which comes up when the flash charge knob 10 is slid to an ON position, as shown in FIG. 1, and retracts into the unit body 2 when the flash charge knob 10 is slid to an OFF position, as shown in FIG. 2. When the flash unit 16 is charged up and ready to flash, light is projected from the light guide 4.

Figure 4:
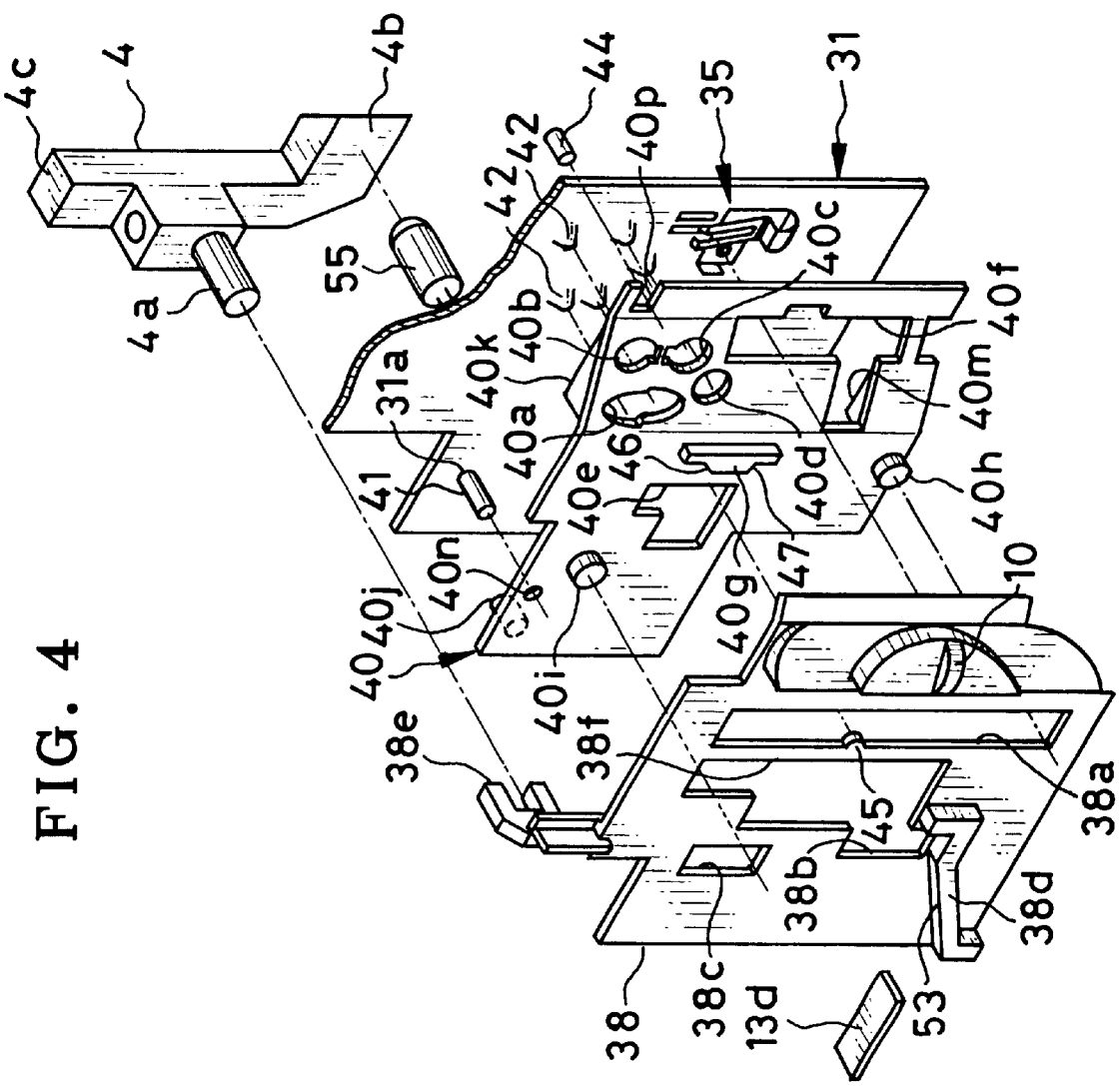
FIG. 4 is an exploded view of a flash charging mechanism of the film unit of FIG. 1, according to a first embodiment of the invention.
Figure 4:
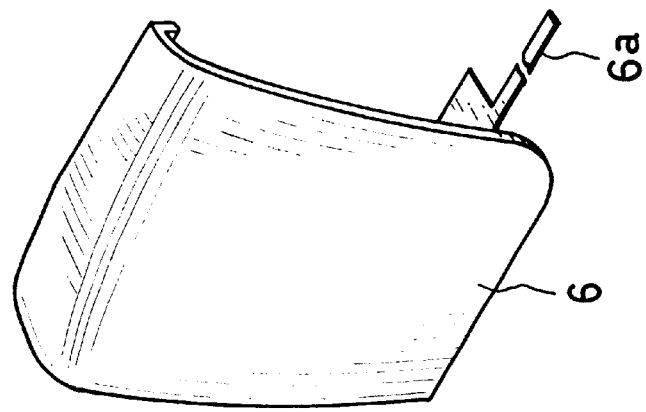

As shown in FIG. 4, the flash charge knob 10 is integrally formed with a knob base plate 38. The knob base plate 38 is provided with openings 38a, 38b and 38c, a interconnection guide member 38d and a fork member 38e. A knob guide plate 40 is provided in between the flash circuit board 31 and the knob base plate 38. The knob guide plate 40 guides the knob base plate 38 in the sliding direction of the flash charge knob 10, i.e. in a vertical direction in the drawings, and positions the knob base plate 38 relative to the flash circuit board 31.

The knob guide plate 40 has openings 40a, 40b, 40c, 40d, 40e and 40f for accepting protrusions on the front side of the flash circuit board 31, such as legs of circuit elements, spots of solder 42 and the flash charge switch 35. The knob guide plate 40 also has protuberances 40g and 40h on its front side that are engaged in openings 38a of the knob base plate 38, and a protuberance 40i that is engaged in an opening 38c of the knob base plate 38.

The knob guide plate 40 has protuberances 40j, 40k and 40m also on its back side, which are pressed against a flat front surface portion of the flash circuit board 31 other than the above mentioned protrusions. These protuberances 40j, 40k and 40m are provided for mounting the knob guide plate 40 stable to the front side of the flash circuit board 31.

The knob guide plate 40 further has a positioning hole 40n and a positioning cutout 40p. On the other hand, a pin 41, which is formed integrally with a base portion of the synchronizing switch 34, protrudes through a hole 31a of the flash circuit board 31 toward the knob guide plate 40. When the knob guide plate 40 is positioned relative to the circuit board 30, the pin 41 is inserted into the positioning hole 40n, whereas a pin 44 that protrudes from a front wall portion of the film roll chamber 23 is inserted into the positioning cutout 40p.

The opening 38a of the knob base plate 38 is vertically elongated.

A projection 45 is formed on a middle position of one side edge of the opening 36a. The protuberance 40g engaged in the opening 38a is a substantially rectangular member whose width is slightly less than the width of the elongated opening 38a. The protuberance 40g has stepped recesses 46 and 47 in upper and lower corners of its one side opposing to the side edge of the opening 38a that has the projection 45. Thus, the opening 38a and the protuberance 40g constitute a click stop mechanism by which the flash charge knob 10 is held in the ON position as the projection 45 click fits in the recess 46, or in the OFF position as the projection 45 click fits in the recess 47 respectively. A wall portion 38f between the openings 38a and 38b is so slim as to be resiliently deformable when the projection 45 moves between the recesses 46 and 47.

Figure 5:
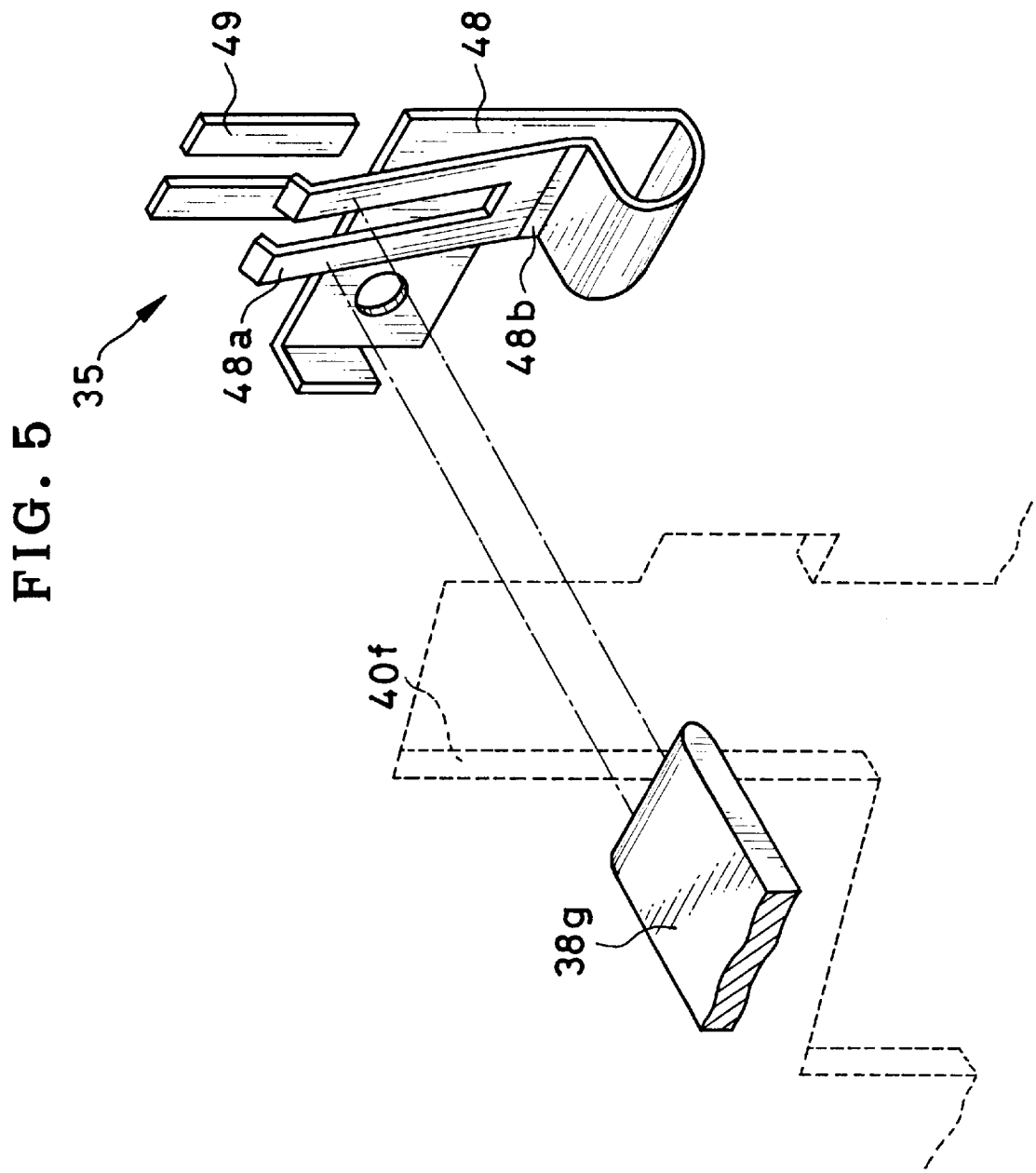
FIG. 5 is an explanatory diagram illustrating a relationship between a projection provided on a back of a charge operation knob and the flash charge switch.

As shown in detail in FIG. 5, the flash charge switch 35 is constituted of a metal contact blade 48 having a pair of resilient arms 48a, and a pair of contact chips 49 formed on the flash circuit board 31. A projection 38g is formed integrally with the knob base plate 38 on the back of the flash charge knob 10. The projection 38g reaches the arms 48a through the opening 40f of the knob guide plate 40f. When the flash charge knob 10 is in the OFF position, the projection 38g is opposed to a recessed base portion 48b of the arms 48a and thus hardly pushes the arms 48a. While the flash charge knob 10 is slid upward from the OFF position to the ON position, the projection 38g gradually urges the arms 48a toward the contact chips 49. When the projection 45 click fits in the recess 46 of the protuberance 40g, free ends of the arms 48a are brought into contact with the contact chips 49, turning on the flash charge switch 35.

The metal contact blade 48 is bent around in a U-turn at the base of the resilient arms 48a. According to this configuration, the arms 48a bend sufficiently under a small amount of pushing force. For the sake of reliable ON-OFF operation, a certain distance must be provided between the contact chips 49 and the free ends of the arms 48a in the OFF position, so as the metal contact blade 48 not to touch the contact chips 49 by accident and cause the flash circuit to start charging unnecessarily. In a conventional flash unit, on the other hand, an electric contact is bent obliquely from its fixed end to its free end for providing resilient arms. Therefore, in order to space the free end from the circuit board, it is necessary to make the resilient arms have a certain length or bend the electric contact at a large angle. Since the film unit is expected to be more compact, also the flash unit and thus the electric contact are desired to be made smaller. If the electric contact is made smaller by making resilient arms short and bending at a large angle, a large load is needed to bend the resilient arms. Accordingly, the electric contact would be under heavier stresses in the ON position. Because the resilient arms are repeatedly bent at each charging operation, the resiliency of the arms gradually decreases under the heavier stresses, making the ON-OFF operation unreliable. By bending the base of the arms 48a to make a U-turn, it needs less load for bending the arms 48a by a certain amount than the conventional electric contact needs. Therefore, the resiliency of the arms 48a does not decrease even if the arms 48a are depressed for a long time.

Referring again to FIG. 4, the interconnection guide member 38d is interlocked with a strip 6a that is formed integrally with the lens cover 6, when the lens cover 6 is moved to the closed position. If the flash charge knob 10 is in the ON position at that time, the strip 6a strikes against a slope 53 of the guide member 38d, and pushes down the knob base plate 38 as the lens cover 6 moves to the closed position. When the lens cover 6 moves in the closed position, the strip 6a comes into contact with a horizontal top surface of the guide member 38d, thereby locking the knob base plate 38 and thus the flash charge knob 10 in the OFF position. Designated by 13d is a guide plate for guiding the strip 6a. The guide plate 13d is formed integrally on the rear side of the front cover 13 above and along a horizontal course of the strip 6a.

The fork member 38e is engaged with a pin projection 4a of the light guide 4, so that the light guide 4 moves up and down together with the updown movement of the knob base plate 38. When the flash charge knob 10 reaches the ON position, a light entering surface 4b of the light guide 4, placed in a lower end of the indicator 4, is opposed to a light emitting diode (LED) 55 that is mounted on the flash circuit board 31, and a light outlet 4c of the light guide 4 protrudes out of the unit body 2.

Figure 6:
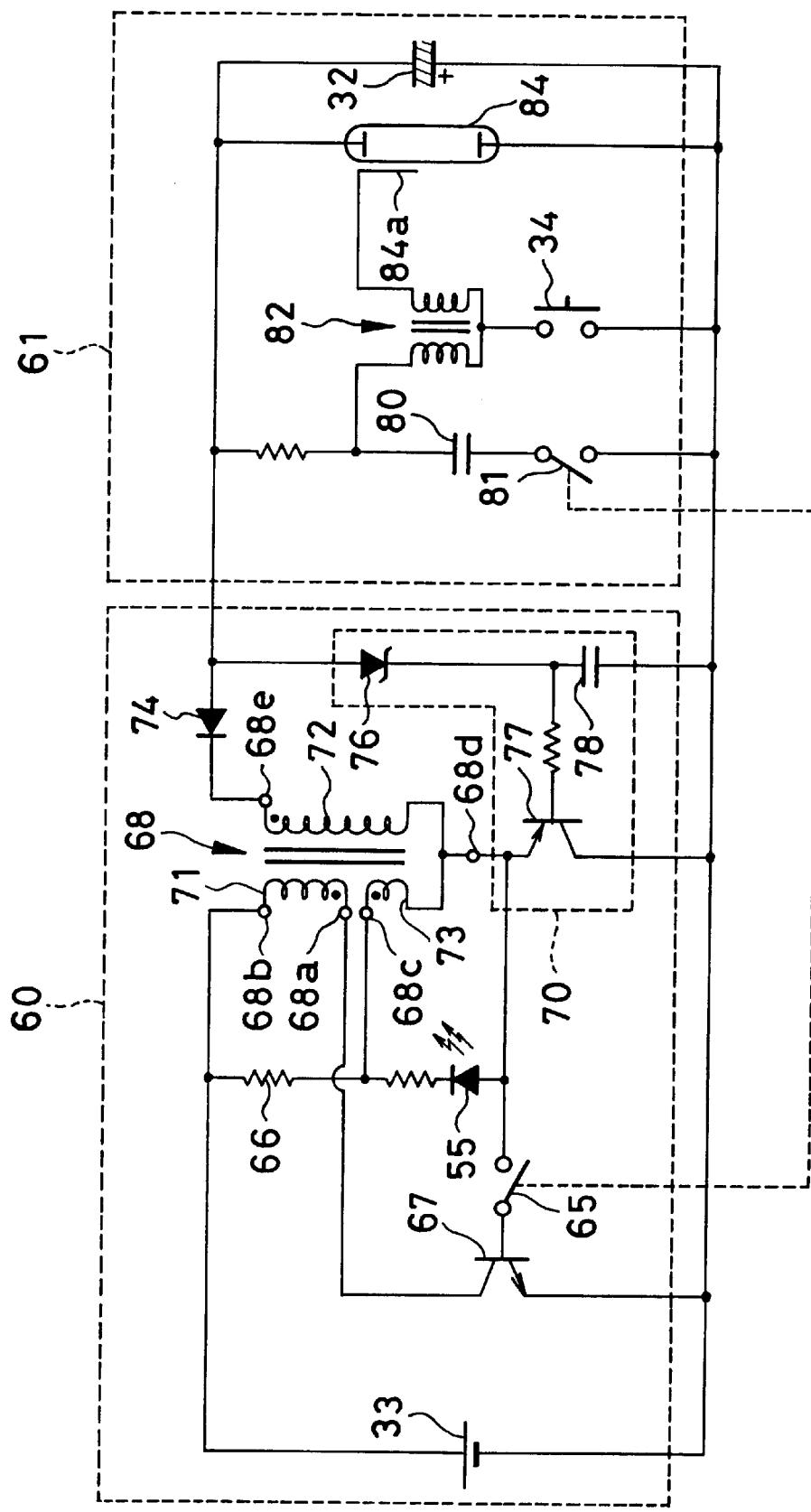
FIG. 6 is a circuit diagram of the flash device of the film unit.

FIG. 6 shows an example of flash circuit formed on the flash circuit board 31. The flash circuit may be roughly divided into a booster circuit 60, a light emission circuit 61 and an auto-cutting circuit 70. The booster circuit 60 is comprised of the battery 33 supplying a power source voltage of 1.5 V, the flash charge switch 35, and a well-known blocking oscillator consisting of an NPN type oscillating transistor 67 and an oscillating transformer 68. The booster circuit 60 is for boosting the low level voltage from the battery 33 up to a high level voltage.

The oscillating transformer 68 consists of a primary coil 71, a secondary coil 72 and a tertiary coil 73, which are inductively coupled to one another. In the oscillating transformer 68, terminals of the primary coil 71 are referred to as first and second terminals 68a and 68b, one terminal of the tertiary coil 73 is referred to as a third terminal 68c, another terminal of the tertiary coil 73, which is connected to one terminal of the secondary coil 72, is referred to as a fourth terminal 68d, and another terminal of the second coil 72 is referred to as a fifth terminal 72.

The first and second terminals 68a and 68b are connected to a collector of the oscillating transistor 67 and a plus pole of the battery 33 respectively. The third terminal 68c is connected to the plus terminal of the battery 33 through a resistor 66. The fourth terminal 68d is connected to a base of the oscillating transistor 67 through the flash charge switch 35. An emitter of the oscillating transistor 67 is connected to a minus pole of the battery 33, and is grounded. The fifth terminal 68e is connected to a cathode of a rectifying diode 76 whose anode is connected to a minus pole of the light emission circuit 61, that is, a minus pole of the main capacitor 32.

The booster circuit 60 is activated when the flash charge switch 35 is turned on and the current flows into the base of the oscillating transistor 67 through the resistor 66, the tertiary coil 33 and the flash charge switch 35. Thereby, an electromotive force of a high voltage, e.g. 350V, is induced on the secondary coil 72 in accordance with a turn ratio of the secondary coil to the primary coil 71. The electromotive force on the secondary coil 72 lets a secondary current flow into the light emission circuit 61 through a rectifying diode 74, and the secondary current charges the main capacitor 32.

The light emission circuit 61 is constituted of the main capacitor 32, a triggering capacitor 80, a flash selection switch 81 connected in series to the triggering capacitor 80, a triggering coil 82, the synchronizing switch 34, a flash discharge tube or Xe-tube 84, and so forth. The triggering capacitor 80 is charged by the secondary current from the booster circuit 60 in the same way as the main capacitor 32 when the flash selection switch 81 is ON.

The flash selection switch 81 is turned ON or OFF when the flash charge knob 10 is slid to the ON position or to the OFF position respectively. That is, the flash selection switch 81 cooperates with the flash charge switch 35. The synchronizing switch 34 is turned on when a shutter blade fully opens for the exposure. When the synchronizing switch 34 is turn on while the flash selection switch 81 is ON, the triggering capacitor 80 discharges, and the discharged current flows through a primary side of the triggering coil 82, so a high level triggering voltage, e.g. 4 KV, is induced on a secondary side of the triggering coil 82. The triggering voltage is applied to the flash discharge tube 84 through a triggering electrode 84a. As a result, the flash discharge tube 84 is broke down, and the main capacitor 32 is discharged through the flash discharge tube 84, causing the flash discharge tube 84 to fire. If, however, the flash selection switch 81 is OFF, the triggering capacitor 80 is stopped from discharging, so that the flashing is not effected even when the main capacitor 32 and the triggering capacitor 80 are fully charged.

The LED 55 for indicating the completion of charging the main capacitor 32 is inexpensive compared with a neon lamp that has conventionally been used for the same purpose. In this embodiment, the LED 55 is a popular type LED having a threshold voltage Vf of 1.8V or so and thus being able to emit light stably at a voltage of 2V or so. Since the voltage from the battery 33 is not large enough to activate the LED 55, the LED 55 is driven by a voltage that is tapped from the oscillating transformer 68 and thus varies proportionally to the charge voltage Vc of the main capacitor 32. The tapped voltage is designed to reach a sufficient level enough to drive the LED 55, when the charge voltage Vc reaches a predetermined level Vcx necessary for flashing.

The LED 55 is connected at its anode to the fourth terminal 68d of the tertiary coil 73, and at its cathode to the third terminal 68c through a current limiting resistor. The LED 55 is driven by a potential difference between a potential V4 at the fourth terminal 68d, i.e. the base voltage of the oscillating transistor 67, and a potential V3 at the third terminal 68c. That is, the LED 55 is driven by a voltage (V4−V3) across the third and fourth terminals.

Figure 7A:
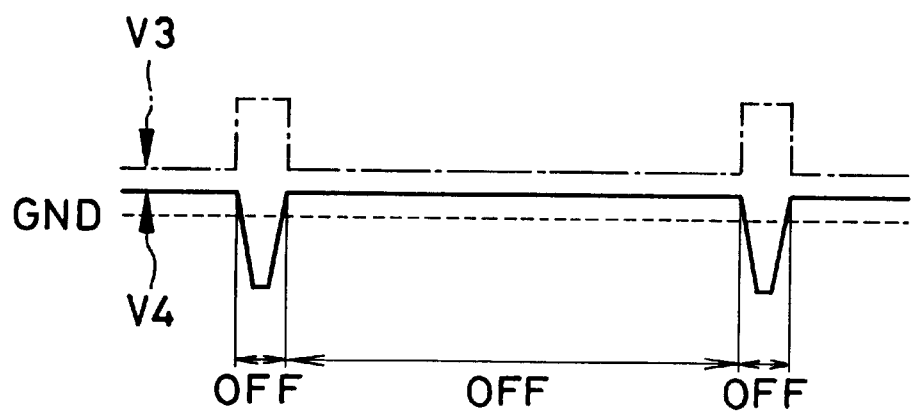
FIGS. 7A and 7B are timing charts illustrating a relationship between charge voltage and a light emitting diode.

As shown in FIG. 7A, the potential V4 at the fourth terminal 68d takes a constant level determined by the base-emitter voltage of the oscillating transistor 67, while the electromotive force is induced on the coils 71 to 73.

Assuming that a potential at the minus pole of the battery 33 is the reference level, i.e. 0V, the potential level V3 surges like a pulse while a back electromotive force is induced on the secondary coil 72. The potential V4 at the fourth terminal 68d is maintained constant independently of the charge voltage Vc of the main capacitor 32.

Figure 7B:
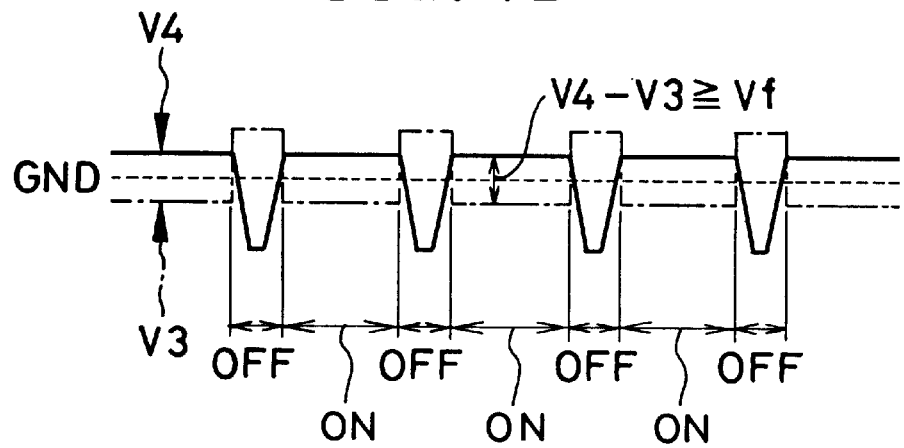

On the other hand, the potential V3 at the third terminal 68c is constant while the electromotive force is induced on the coils 71 to 73, and drops down steeply while the back electromotive force is induced on the secondary coil 72. However, as shown in FIG. 7B, the potential V3 wholly goes down as the charge voltage Vc goes up. This is because the potential at the fifth terminal 68e goes down as the charge voltage Vc goes up, and the secondary coil 72 is inductively coupled to the tertiary coil 73. In this flash circuit, as the charge voltage Vc goes up, the potential at the minus pole of the main capacitor 32 goes down. The relationship between the charge voltage Vc and the potentials V3 and V4 at the third and fourth terminals 68c and 68d is given by the following equation:

$$N3/N2(V3-V4)=(-Vc)-V4$$

wherein N2 represents the number of turns of the secondary coil 72, and N3 represents the number of turns of tertiary coil 73.

At the first stage of charging, the potential V3 at the third terminal 68c is higher than the potential V4 at the fourth terminal while the electromotive force is induced on the tertiary coil 73. Therefore, the voltage (V4−V3) is applied across the LED 55 in the reverse direction, so that the LED 55 does not emit light.

As the main capacitor 32 is gradually charged and thus the charge voltage Vc goes up, the oscillating frequency of the blocking oscillator goes up, so the electromotive force and the back electromotive force alternate more frequently. Since the potential V4 at the fourth terminal 68d is unchanged independently of the charge voltage Vc, the potential V3 finally goes below the potential V4 while the electromotive force is induced on the tertiary coil 73, as is shown in FIG. 7B. Then, a voltage is applied across the LED 55 in the forward direction. However, until the charge voltage Vc does not reach an indication level, e.g. 265V, that corresponds to the threshold voltage Vf of the LED 55, the forward voltage is less than the threshold voltage Vf, so the LED 55 does not emit light.

First when the charge voltage Vc goes above the indication level, the voltage across the third and fourth terminals (V4−V3) goes above the threshold voltage Vf, so the LED 55 emits light at each occasion of electromotive force. However, the voltage applied in this stage is not enough for the LED 55 to emit light at a sufficient intensity. When the charge voltage Vc goes up to around the predetermined charge voltage Vcx, the forward voltage across the LED 55 reaches a sufficient level, i.e. 2V or more, for driving the LED 55 to emit light intensely.

So long as the back electromotive force is generated in the tertiary coil 73, the voltage (V4−V3) is always applied in the reverse direction across the LED 55 regardless of the charge voltage Vc, so the LED 55 does not emit light. But in the stage where the main capacitor 32 is charged up to around the predetermined charge voltage Vcx, the blocking oscillator oscillates at a high frequency of about 10 KHz, the LED 55 looks like emitting light without any intermission. After the main capacitor 32 is charged up to the predetermined level Vcx, the LED 55 emits light intermittently in cooperation with the auto-cutting circuit 70 that is provided for charging the main capacitor 32 intermittently to supplement the charge voltage Vc. In this way, the LED 55 emits light for indicating that charging the main capacitor 32 is completed. The light from the LED 55 is projected to the outside of the unit body 2 through the light guide 4.

The LED 55 is also used for indicating whether a flash photography is being made or not. That is, if the LED 55 emits light continuously or intermittently, a flash light is projected at every exposure. If not, a flash light is not projected. This is because the LED 55 emits light while the main capacitor 32 is almost charged up to the predetermined charge voltage Vcx and, at the same time, the flash charge knob 10 is in the ON position and thus the flash charge switch 35 and the flash selection switch 81 are both turned on. On the contrary, since the LED 55 does not emit light when the charge voltage Vc of the main capacitor 32 is low, or when the flash charge knob 10 is in the OFF position and thus the flash charge switch 35 and the flash selection switch 81 are turned off, flash light is no projected at any exposure while the LED 55 does not emit light.

Using an LED for indicating charging condition as well as for indicating if a flash photography is being made is impossible in those flash circuits where charging is made only while the charge switch is kept being pressed, or where charging starts each time the charge switch being operated, and stops automatically when the charge voltage reaches the predetermined level Vcx. This is because the LED would be turned off as soon as the charge switch gets out of pressure, or the flash circuit stops charging. On the contrary, in the flash circuit according to the present invention, since the flash charge knob 10 is used for starting or stopping charging as well as for selecting a flash photography, the LED 55 may be used for indicating the completion of charging and whether a flash light is being projected or not.

The auto-cutting circuit 70 is provided for reducing the power consumption of the battery 33 while the flash charge switch 35 is kept being turned on after the completion of charging. The auto-cutting circuit 70 is incorporated into the booster circuit 60, and is mainly constituted of a Zener diode 76, a PNP-type stopping transistor 77, and a noise reduction capacitor 78. The Zener diode 76 is connected at its anode to the minus pole of the main capacitor 32, and at its cathode to a base of the stopping transistor 77. A collector of the stopping transistor 77 is connected to an emitter of the oscillating transistor 67, and an emitter of the stopping transistor 77 is connected to the base of the oscillating transistor 67 through the flash charge switch 35.

According to this configuration, the charge voltage Vc of the main capacitor 32 is applied across the Zener diode 76 in the reverse direction. When the charge voltage Vc reaches the predetermined level Vcx, a Zener current or reverse current flows through the Zener diode 76 into the base of the stopping transistor 77, so that the stopping transistor 77 is turned on. As a result, the base and the emitter of the oscillating transistor 67 are shortcircuited, and thus the oscillating transistor 67 is turned off, deactivating the booster circuit 60. In this way, the auto-cutting circuit 70 stops the booster circuit 60 from charging when the main capacitor 32 is charged up to the predetermined voltage Vcx.

Figure 8:
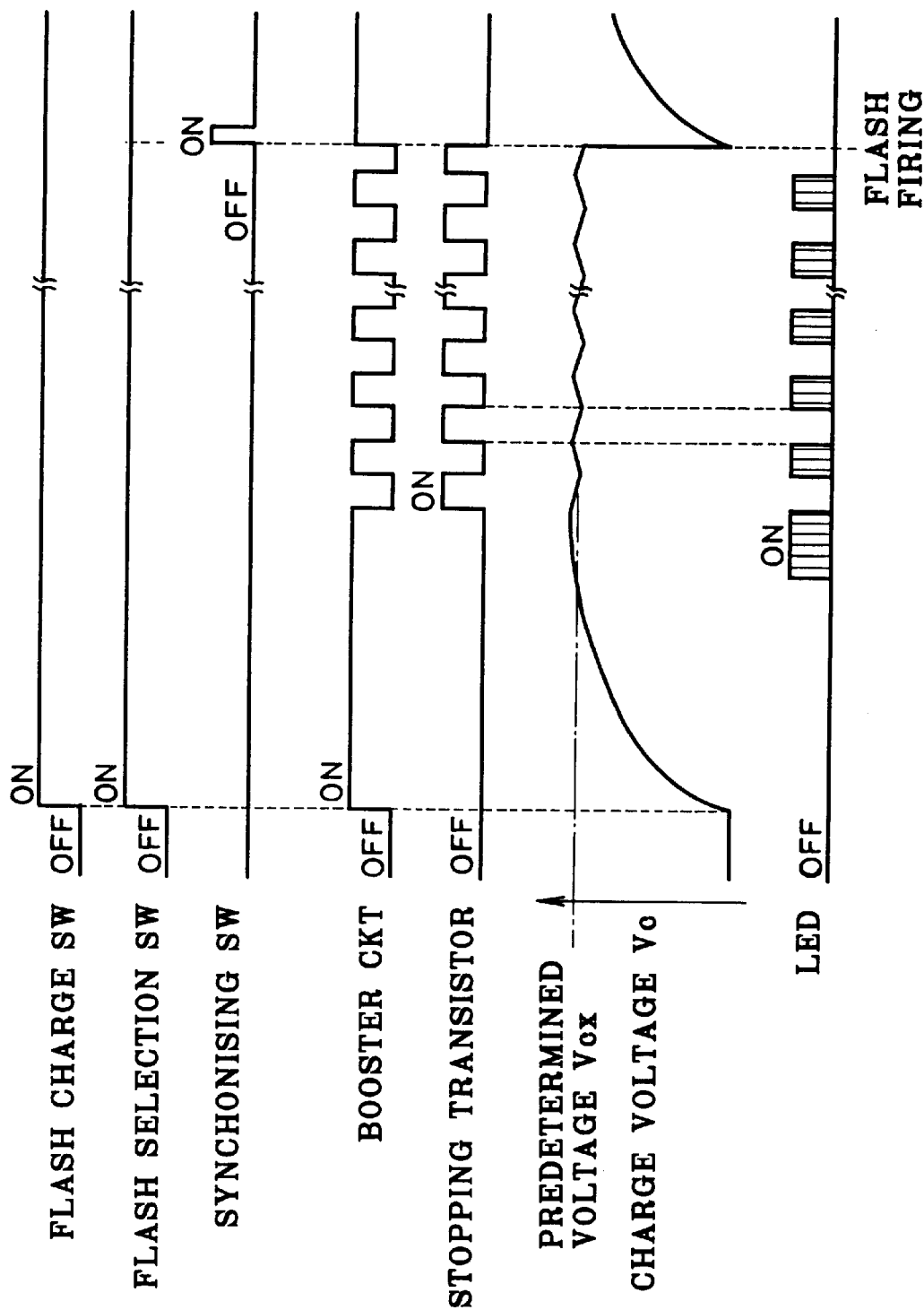
FIG. 8 is timing charts illustrating an operation of the flash device.

The Zener diode 76 lets the Zener current flow and turns the stopping transistor 77 on only while the charge voltage Vc of the main capacitor 32 is above the predetermined level Vcx. Therefore, when the charge voltage Vc goes below the predetermined level Vcx as the result of Zener current flowing, or spontaneous discharging of the main capacitor 32, the stopping transistor 77 is turned off, and the booster circuit 60 is enabled to operate again. If the flash charge switch 35 is ON at that time, the booster circuit 60 restarts charging. The overall operation of the flash circuit is illustrated in FIG. 8.

As described so far, the booster circuit 60 is activated intermittently while the flash charge switch 35 is maintained in the ON position after the main capacitor 32 is charged up to the predetermined voltage Vcx. Therefore, the power consumption of the battery 33 is reduced, while the main capacitor 32 is supplementarily charged to maintain the charge voltage Vc around the predetermined level Vcx. Thus, the probability of running down the battery 33 and making the flash light unusable thereafter is lowered, even when the photographer forgets to reset the flash charge knob 10 to the OFF position for a long time.

Although the auto-cutting circuit 70 leads to increase the cost of the flash circuit, the cost increase is reduced by using the cheaper LED 55 in place of the conventionally used expensive neon lamp, as set forth above.

In the above described auto-cutting circuit 70, the Zener diode 76 is designed to have a large operating resistance, so that the stopping transistor 77 is turned on with a slight delay time after the main capacitor 32 is charged up to the predetermined voltage Vcx. Accordingly, the flash circuit stops charging when the charge voltage Vc goes slightly above the predetermined level Vcx. Thereby, it takes a certain time till the charge voltage Vc is lowered below the predetermined level Vcx, so an appropriate time interval is provided from the stop of charging to the restart of charging, which reduces the power consumption effectively.

It is possible to use a Zener diode of a smaller operating resistance as the Zener diode 76. In that case, the booster circuit 60 operates at shorter intervals or substantially continuously. By connecting a large capacity capacitor in addition to the auto-cutting circuit 70, such that the Zener current is charged once in the capacitor, and using its charge voltage for turning on the stopping transistor 77 for a certain time, the time of intermission of the booster circuit 60 would be elongated. It is of course possible to use a large capacity capacitor in combination with a Zener diode having a large operating resistance in the auto-cutting circuit, to assertively elongate the time of intermission of charging.

The above described embodiment operates as follows:

When assembling the film unit 1, first the exposure unit 15 is attached to the front of the basic portion 15, and the flash unit 16 is mounted between the exposure unit 15 and the film roll chamber 23 with the main capacitor 32 placed above the film roll chamber 23. Then the knob guide plate 40 is mounted to the flash circuit board 31 with its protuberance 40g on the front side, and with its positioning hole 40n and cutout 40p on the pins 41 and 44 respectively. Thereby, the opening 40f is opposed to the flash charge switch 35, and the back protrusions 40j, 40k and 40m come in contact with the flat front surface portion of the flash circuit board 31, positioning the knob guide plate 40 stably on the flash circuit board 31.

Thereafter, the knob base plate 38 is mounted to the knob guide plate 40 such that the protuberances 40g and 40h are inserted in the opening 38a, whereas the protuberance 40i is inserted in the opening 38c. When the knob base plate 38 is mounted, the light guide 4 is set in the retracted position, so the fork member 38e is engaged with the pin projection 4a of the light guide 4 by putting the projection 45 in the recess 47 of the protuberance 40g. In this way, the knob base plate 38 is positioned in a very stable manner. Thereafter, the front cover 13 is attached to the front of the basic portion 14 so as to cover the exposure unit 15 and the flash unit 16.

Then, the photo film cartridge 17 is loaded from the rear side into the basic portion 14, and the rear cover 18 is attached to the basic portion 14, in a manner as described above. After the unit body 2 is assembled in this way, the label 3 is put around the unit body 2, producing the complete film unit 1.

While the film unit 1 is not used, the taking lens 7 and the viewfinder 8 are closed with the lens cover 6, as shown in FIG. 2. In the closed position, the strip 6a presses the horizontal top surface of the interconnection guide member 38d, stopping the flash charge knob 10 from moving to the ON position.

When using the film unit 1, the lens cover 6 is slid to the open position, uncovering the taking lens 7. If a flash photography is needed, the flash charge knob 10 is moved to the upper ON position. Since the strip 6a is removed from the interconnection guide member 38d in cooperation with the lens cover 6, the flash charge knob 10 is allowed to move upward. When the flash charge knob 10 is set to the ON position, the light guide 4 protrudes from the top side of the unit body 2, and the projection 38g presses the arms 48a of the metal contact blade 48. As a result, the ends of the arms 48a are brought into contact with the contact chips 49, and the flash charge switch 35 is turned on. Simultaneously, the projection 45 click fits in the recess 46, maintaining the knob base plate 38 in the upper position.

When the flash charge knob 10 is moved in the ON position, the flash charge switch 35 and the flash selection switch 81 are turned on. Then, the booster circuit 60 is activated to starts charging the main capacitor 32 through the rectifying diode 32. Since the flash selection switch 81 is turned on, the triggering capacitor 80 is also charged.

When the main capacitor 32 is charged up to the predetermined voltage Vcx, the LED 55 emits light virtually continuously at a sufficiently high intensity, and the Zener diode 76 conducts the Zener current. Since the operating resistance of the Zener diode 76 is so large, the stopping transistor 77 is turned on with a delay time, and blocks current from the base of the oscillating transistor 67, deactivating the booster circuit 60. Thus, the main capacitor 32 stops being charged when the charge voltage Vc goes slightly above the predetermined voltage Vcx.

After the completion of charging, when the charge voltage Vc goes below the predetermined level Vcx in result of the spontaneous discharge of the main capacitor 32 or the conduction of the Zener current, the Zener diode 76 stops conducting the Zener current, and thus the stopping transistor 77 is turned off. Then, the current begins to flow into the base of the oscillating transistor 67 again, and the booster circuit 60 restarts working. Thereafter, the booster circuit 60 alternately starts and stops working to intermittently supplement the charge voltage Vc so as to maintain the predetermined level Vcx as long as the flash charge switch 35 is ON. During the intermittent supplemental charging, the LED 55 emits light intermittently.

After confirming the completion of charging to see the light from the LED 55 through the light guide 4, the photographer presses the shutter button 12 to take a photograph. Upon the shutter button 12 being depressed, the shutter blade is driven, and the synchronizing switch 34 is turned on by the shutter blade at its fully open position. Since the flash selection switch 81 is ON, the triggering capacitor 80 discharges to apply the triggering voltage to the flash discharge tube 84, causing the main capacitor 32 to discharge. So the flash discharge tube 84 fires a flash of light.

Because the main capacitor 32 is discharged, the auto-cutting circuit 70 does not keep the booster circuit 60 from working. Since the flash charge switch 35 is ON, the booster circuit 60 restart working to charge the main capacitor 32 in the same way as described above. The LED 55 emits light again when the charge voltage Vc of the main capacitor 32 reaches the indication level.

When the lens cover 6 is closed while the flash charge knob 10 is in the ON position, the taking lens 7 is covered with the lens cover 6 and, simultaneously, the strip 6a pushes the slope 53 of the interconnection guide member 38d to push down the knob base plate 38, thereby turning off the flash charge switch 35. If the photographer wants to take a photograph without flash, the flash charge knob 10 is moved down by hand to turn off the flash charge switch 35, while keeping the lens cover 6 in the open position.

By setting the flash charge knob 10 to the OFF position, the flash selection switch 81 as well as the flash charge switch 35 is turned off. The flash charge knob 10 may be operated before or after the main capacitor 32 is charged up. When the flash charge switch 35 is turned off, the battery 33 is disconnected from the base of the oscillating transistor 67, so the booster circuit 60 is deactivated to stop charging.

For instance, even after the main capacitor 32 is charged up above the predetermined voltage Vcx, if the booster circuit 60 is deactivated by turning off the flash charge switch 35, the LED 55 is also turned off. Therefore, the photographer can easily see if the flash light is going to fire or not by observing the lighting condition of the LED 55 without the need for confirming the position of the flash charge knob 10.

If the shutter button 12 is pressed to turn on the synchronizing switch 34 in this situation, since the flash selection switch 81 is turned off, the triggering capacitor 80 does not discharge even while it is charged. Consequently, the main capacitor 32 does not discharge even while it is fully charged, so that any flash light is fired at this exposure.

If the photographer forgets to reset the flash charge knob 10 to the OFF position, the auto-cutting circuit 70 alternately deactivates and activates the booster circuit 60 after the main capacitor 32 is charged up to the predetermined level Vcx, in the same way as described above. Accordingly, the power consumption of the booster circuit 60 is reduced by the intermission compared to the case where the booster circuit 60 is activated continuously. Consequently, the waste of battery 33 is reduced in case the flash charge switch 35 being left in its ON state.

Figure 9:
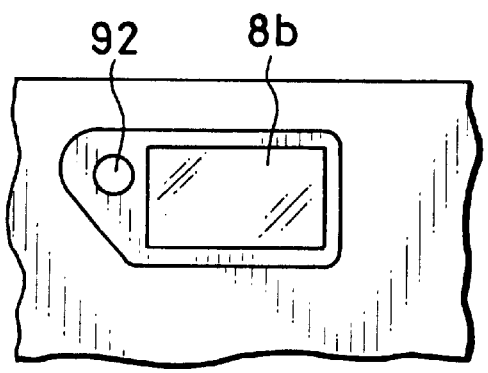
FIG. 9 is a fragmentary view showing an eyepiece window of a viewfinder and a flash charge condition indicator window, according to another embodiment of the invention.

The above described embodiment relates to a film unit having a lens cover, the present invention is applicable to a film unit that does not have a lens cover. The light guide 4 is not necessarily movable, but may be stationary. For example, as shown in FIG. 9, it is possible to provide a window 92 for indicating charging condition beside a finder eyepiece window 8*b*, and conduct light from the LED 55 to the window 92 through a stationary light guide.

In the above embodiment, the LED 55 is driven by the potential difference between the third and fourth terminals of the oscillating transformer 68 such that the LED 55 emits light while electromotive force is induced on the tertiary coil 73. However, it is possible to connect the LED 55 in the opposite direction such that the LED 55 emits light while back electromotive force is induced. In that case, the phenomenons that the potential difference between the third and fourth terminals is above the threshold voltage Vf in the forward direction while back electromotive force is induced, and that the interval of light emission from the LED 55 gets shorter as the charge voltage Vc of the main capacitor 32 gets higher. Concretely, the time duration of each light emission is so short and the interval of light emission is so long before the completion of charging, that the light from the LED 55 is not visible. First when the charge voltage Vc reaches a predetermined voltage, the interval of light emission comes to be short enough to make the light visible.

Instead of the potential difference between the third and fourth terminals, a potential difference between the third terminal and the ground, i.e. the emitter-collector voltage of the oscillating transistor 67, may be used for driving an LED to indicate the completion of charging.

In place of the slidable flash charge knob 10 of the above embodiment, another type of operation member may be used for actuating the flash charge switch 35 and the flash selection switch 81 so far as the operation member is switched over between an ON position and an OFF position, and its switching position is obvious. In order to save the power consumption, it is also possible to cooperate a mechanical timer with the flash charge knob such that the flash charge knob is automatically reset to the OFF position to turn off the flash charge switch and the flash selection switch in a predetermined time after the flash charge knob is set to the ON position.

It is possible to provide a voltage tap at an intermediate position of the secondary coil 72 of the oscillating transistor 67, and connect a Zener diode to the voltage tap, for constituting the auto-cutting circuit. Because the potential at the voltage tap varies proportionally with the charge voltage Vc of the main capacitor 32, the Zener diode may be a cheaper one having a lower Zener voltage in comparison with the above embodiment.

The flash circuit of the present invention may be applicable not only to a flash unit of a film unit, but also to a built-in flash device of a camera and a flash device attachable to a camera as well.

Figure 10:
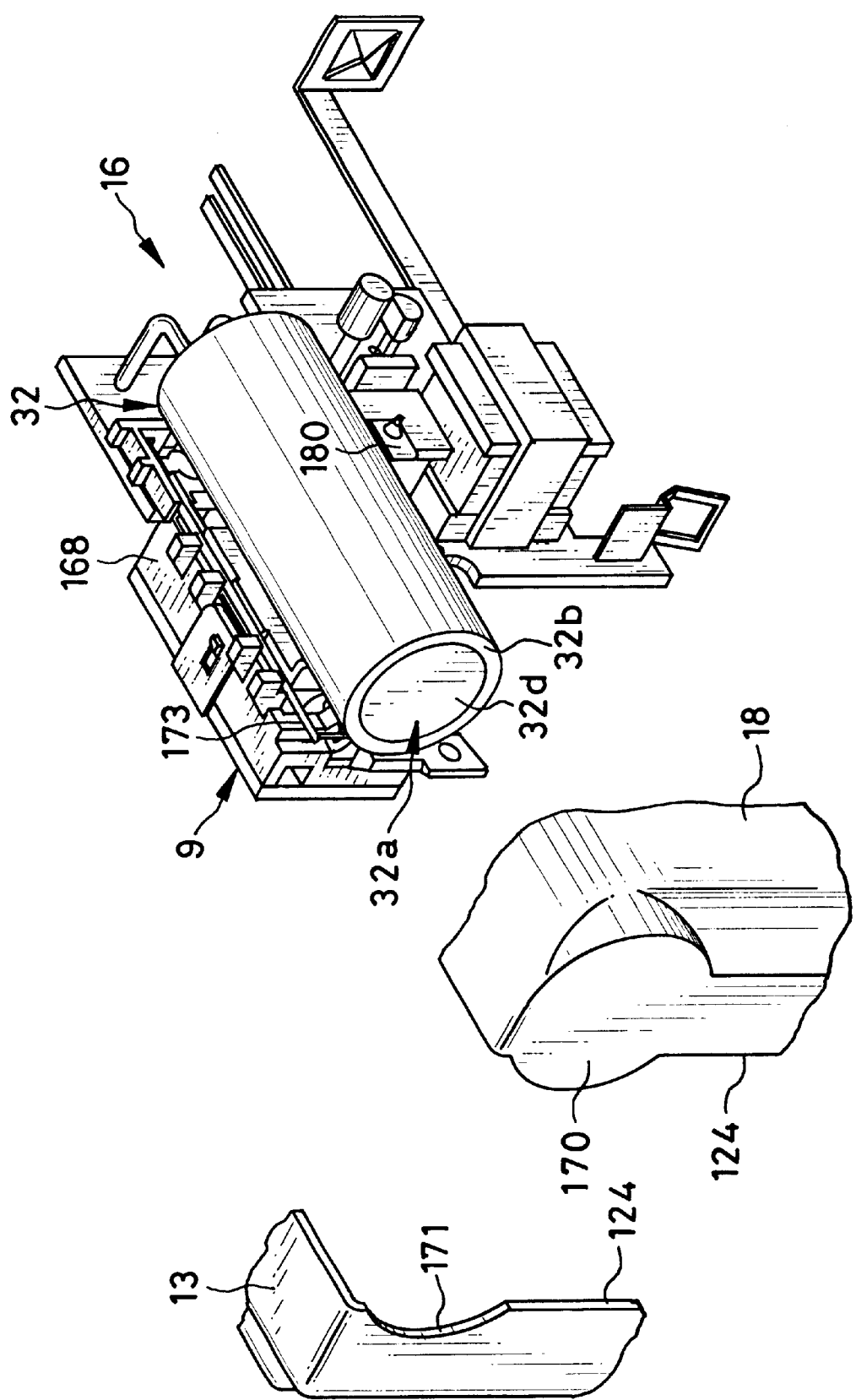
FIG. 10 is an explanatory diagram of essential parts of a film unit according to a further embodiment of the invention.
Figure 11:
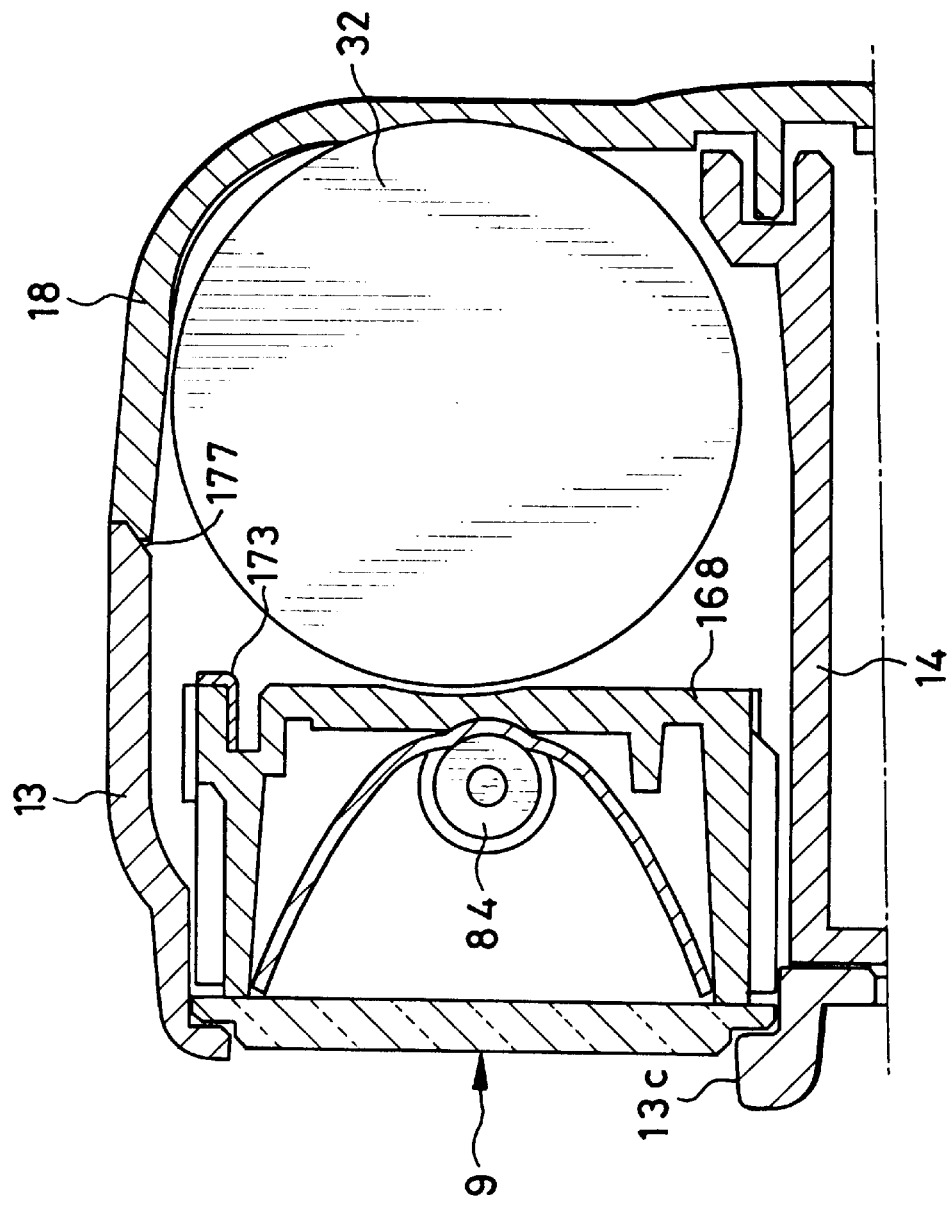
FIG. 11 is a fragmentary sectional view illustrating essential parts of a film unit according to still another embodiment of the invention.

FIGS. 10 and 11 show essential parts of a film unit according to another embodiment of the invention. The film unit of this embodiment may have the same fundamental construction as the above embodiment. So the equivalent members are designated by the same reference numerals, and the description of these members is omitted. The following description relates only to those features specific to or necessary for explaining the present embodiment.

A main capacitor 32 of a flash unit 16 is an aluminum electrolytic capacitor, wherein an impregnated electrolyte is contained in a tight cylindrical aluminum casing that has bottoms and is sealed by rubber or the like. Thereby, the impregnated electrolyte is prevented from evaporation or moisture absorption, and thus characteristics of the impregnated electrolyte are prevented from deteriorating. An isolating vinyl sheave 32*b* is wrapped around the periphery of the aluminum casing 32*a*, and polarity and other indicia are printed on the surface of the vinyl sheave 32*b*. A center portion of one end 32*d* of the aluminum casing 32*a* that constitutes a minus pole of the main capacitor 32 is not wrapped up in the vinyl sheave 32*b*.

Since the film unit is required to be compact, clearances between a housing, e.g. a front cover 13 and a rear cover 18, and internal members, e.g. a basic portion 14, an exposure unit and the flash unit 16, are made as small as possible. As a result, if the film unit should be dropped in the sea or the like, sea water would stay in between the housing and the internal members. The settled water oozes out through joints between the front cover 13 and the rear cover 18 because of a capillary phenomenon.

Figure 12:
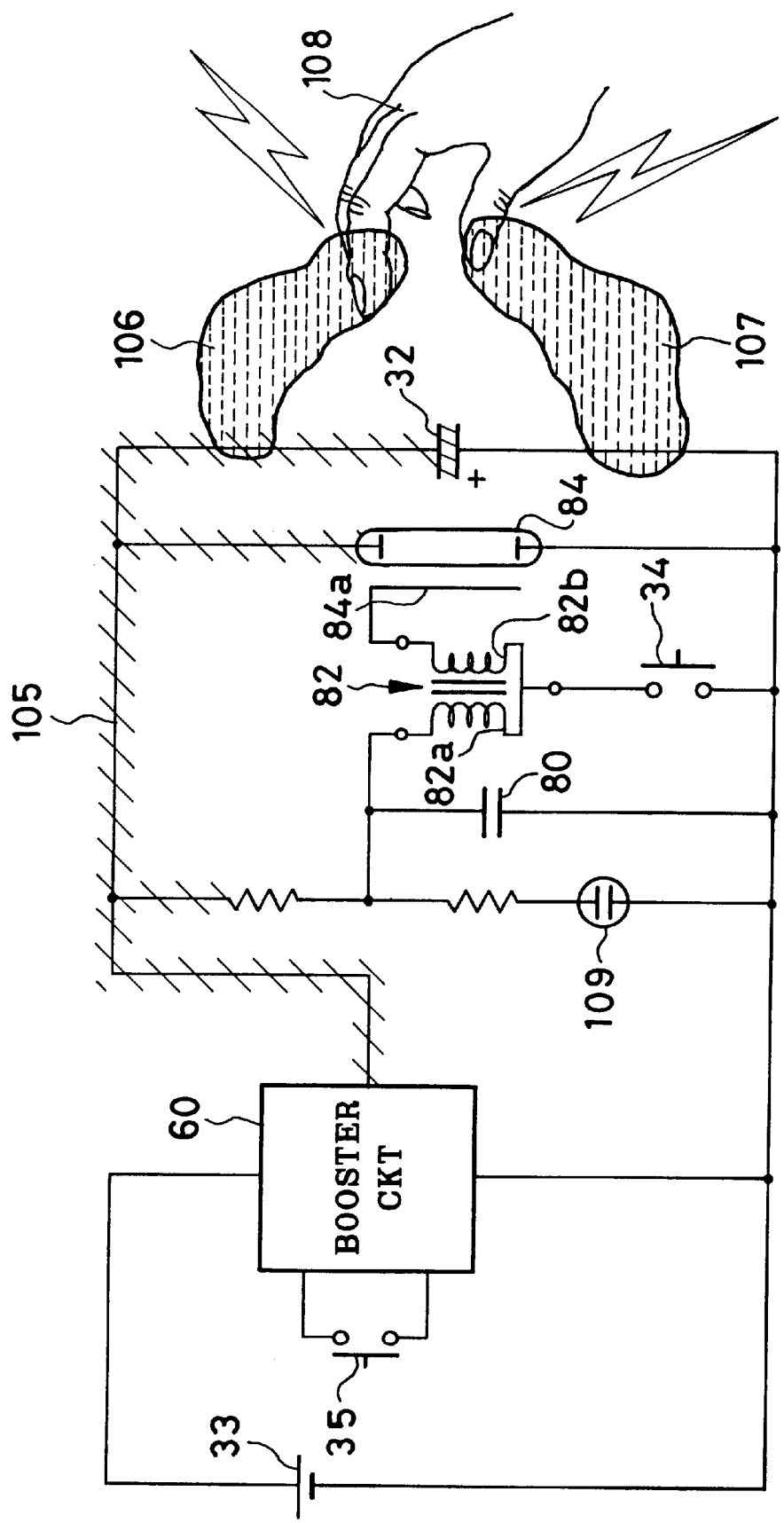
FIG. 12 is an explanatory diagram illustrating how a user can get an electric shock from a flash circuit through sea water.

If a person grips or touches a film unit with extruding sea water 106 by bare hand 108, as shown in FIG. 12, a high voltage current conducting circuit portion 105 consisting of an aluminum casing 32*a* of a main capacitor 32 may be short-circuited to a minus pole of a battery 33 through the sea water 106 and the bare hand 108. Then, the charged current flows through the hand, giving an electric shock to that person. In FIG. 12, designated by 109 is a neon lamp 109 for indicating that the main capacitor 32 is charged up to the predetermined voltage.

To avoid such danger, according to the embodiment shown in FIG. 10, the rear cover 18 has a projection 170 projecting toward the front cover 13 in an area facing to the minus pole or one end 32*d* of the aluminum casing 32*a* of the main capacitor 32, whereas the front cover 13 has a complementary recess 171 to the projection 170. The projection 170 is of a semi-circular shape whose diameter is larger than the external diameter of the aluminum casing 32*a*, such that a side joint 124 between the front and rear covers 13 and 18 is set away from the minus pole 32*d* of the main capacitor 32. Because the joint 124 detours round the minus pole 32*d* of the main capacitor 32 by virtue of these projection 170 and the recess 171, even if sea water or the like seeps into the film unit and seeps out through the joint 124, the seeping water hardly contact the aluminum casing 32*a*. Therefore, the electrification through the sea water is prevented.

In the shown embodiment, the projection 170 is formed on the rear cover 18 and the recess 171 is formed on the front cover 13 because the rear cover 18 is designed to cover more of the minus pole 32*d* of the main capacitor 32 than the front cover 13, if the projection 170 and the recess 171 are not provided. However, where an end 32*d* of a main capacitor 32 would be covered with a front cover more than with a rear cover without any projection and recess along the joints, it is preferable to provide a projection on the front cover and a complementary recess in the rear cover. Although the projection 170 and the recess 171 are semi-circular in the shown embodiment, they may be oblong, polygonal, rectangular, or triangular.

Besides making the side joint 124 detour round the end 32*d* of the aluminum casing 32*a*, it is preferable for preventing the electrification through conductive water such as sea water, to displace an upper joint 177 between the front and rear covers 13 and 18 from a conductive metal strip 173 that conducts current through a flash discharge tube 84. As shown in FIG. 10, the conductive metal strip 173 is placed on an upper corner of a reflector case 168 along an axial direction of the flash discharge tube 84, and constitutes the high voltage current conducting circuit portion 105.

Displacing a joint between the front and rear cover 13 and 18 from a conductive metal blade 180 that constitutes a triggering electrode to the flash discharge tube 84, see FIG. 10, is also preferable for preventing the leakage through the sea water or the like. Also the conductive metal blade 180 constitutes the high voltage current conducting circuit portion 105. The above described configurations for preventing the electrification may be embodied all in one film unit, or it is possible to use one or more of these configurations in one film unit.

Thus, the present invention is not to be limited to the above described embodiments but, on the contrary, various modifications will be possible to those skilled in the art without departing from the scope of appended claims.

What is claimed is:

1. A lens-fitted photo film unit comprising a basic portion containing a roll of photo filmstrip, a flash device for illuminating a subject, an exposure device for exposing the filmstrip to light from the subject, and a front cover covering a front of the basic portion after the exposure device and the flash device are attached to the front of the basic portion, the film unit comprising:

a flash charge switch mounted on a front side of a flash circuit board of the flash device, the flash charge switch being turned on to charge a main capacitor of the flash device;

a charge operation member slidable between an ON position to turn on the flash charge switch and an OFF position to turn off the flash charge switch, the charge operation member being placed between the flash circuit board and the front cover, and partly protruding outward through an opening of the front cover; and a guide member disposed between the charge operation member and the flash circuit board, for holding the charge operation member thereon to be slidable between the ON position and the OFF position, wherein the guide member is arranged so that it neither moves nor flexes with respect to the flash circuit board when the charge operation member is moved between the OFF and ON positions.

2. A lens-fitted photo film unit as claimed in claim 1, further comprising positioning elements for positioning the guide member stationarily relative to the flash circuit board.

3. A lens-fitted photo film unit as claimed in claim 2, wherein the guide member has protuberances on its back side in those positions opposing to flat surface portions of the front side of the flash circuit board, and recesses or cutouts for accepting forwardly projecting portions of the flash circuit board.

4. A lens-fitted photo film unit as claimed in claim 3, wherein the forwardly projecting portions of the flash circuit board include the flash charge switch, legs of circuit elements, and spots of solder.

5. A lens-fitted photo film unit as claimed in claim 1, further comprising a click mechanism for holding the charge operation member either in the ON position or in the OFF position.

6. A lens-fitted photo film unit as claimed in claim 1, wherein the flash charge switch comprises a metal contact blade having at least a resilient arm and being bent roundly at a base portion of the resilient arm, and contact chips formed on the flash circuit board.

7. A lens-fitted photo film unit as claimed in claim 6, wherein the charge operation member continues to press the resilient arm onto the contact chips in the ON position, and does not press the arm in the OFF position.

8. A lens-fitted photo film unit as claimed in claim 1, further comprising a housing for the film unit, the housing consisting of at least two joining parts, wherein joints between the parts of the housing are set away from circuit portions of the flash device where high voltage current flows.

9. The lens-fitted photo film unit of claim 2, wherein the positioning elements comprise a first positioning pin which passes through both a first positioning hole in the flash circuit board and a second positioning hole in the guide member.

10. The lens-fitted photo film unit of claim 9, wherein the positioning elements comprise a second positioning pin which passes through a cutout in the guide member.

11. The lens-fitted photo film unit of claim 10, further comprising a projection extending away from a rear surface of the charge operation member, wherein the projection is in contact with the flash charge switch when the charge operation member is in the ON position, and the projection is not in contact with the flash charge switch when the charge operation member is in the OFF position.

12. The lens-fitted photo film unit of claim 11, wherein the projection passes through an aperture in the guide member.

13. The lens-fitted photo film unit of claim 12, further comprising a plurality of orientation protrusions extending away from a front surface of the guide member which pass through orientation slots in the charge operation member to allow the charge operation member to move back and forth along a linear path with respect to the guide member and the flash circuit board.

14. The lens-fitted photo film unit of claim 13, wherein the guide member is in direct contact with the flash circuit board.

15. The lens-fitted photo film unit of claim 2, wherein the positioning elements comprise a second positioning pin which passes through a cutout in the guide member.

16. The lens-fitted photo film unit of claim 1, further comprising a projection extending away from a rear surface of the charge operation member, wherein the projection is in contact with the flash charge switch when the charge operation member is in the ON position, and the projection is not in contact with the flash charge switch when the charge operation member is in the OFF position.

17. The lens-fitted photo film unit of claim 16, wherein the projection passes through an aperture in the guide member.

18. The lens-fitted photo film unit of claim 1, further comprising a plurality of orientation protrusions extending away from a front surface of the guide member which pass through orientation slots in the charge operation member to allow the charge operation member to move back and forth along a linear path with respect to the guide member and the flash circuit board.

19. The lens-fitted photo film unit of claim 1, wherein the guide member is in direct contact with the flash circuit board.

* * * * *